United States Patent
Inoke et al.

(10) Patent No.: US 8,432,393 B2
(45) Date of Patent: Apr. 30, 2013

(54) MESHING DEVICE

(75) Inventors: Misao Inoke, Kawasaki (JP); Rikako Shinomiya, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1157 days.

(21) Appl. No.: 11/902,933

(22) Filed: Sep. 26, 2007

(65) Prior Publication Data

US 2008/0150941 A1    Jun. 26, 2008

(30) Foreign Application Priority Data

Dec. 26, 2006    (JP) ................................. 2006-349828

(51) Int. Cl.
*G06T 17/00*    (2006.01)

(52) U.S. Cl.
USPC ............... 345/420; 345/423; 345/427; 703/1

(58) Field of Classification Search .................. 345/427, 345/419; 716/20
See application file for complete search history.

(56) References Cited

U.S. PATENT DOCUMENTS

| | | | | |
|---|---|---|---|---|
| 5,553,009 A | * | 9/1996 | Meshkat et al. | 716/106 |
| 5,946,479 A | * | 8/1999 | Sakaguchi et al. | 716/20 |
| 6,212,484 B1 | * | 4/2001 | Chen | 703/2 |
| 6,259,453 B1 | * | 7/2001 | Itoh et al. | 345/423 |
| 6,271,875 B1 | * | 8/2001 | Shimizu et al. | 348/42 |
| 6,411,862 B1 | * | 6/2002 | Hazama et al. | 700/182 |
| 6,542,937 B1 | * | 4/2003 | Kask et al. | 719/328 |
| 6,597,368 B1 | * | 7/2003 | Arai et al. | 345/646 |
| 2005/0057561 A1 | * | 3/2005 | El-Din ElShishiny et al. | 345/419 |
| 2006/0212278 A1 | * | 9/2006 | Hirai | 703/2 |
| 2007/0285425 A1 | * | 12/2007 | Bae et al. | 345/427 |
| 2008/0143708 A1 | * | 6/2008 | Owen et al. | 345/419 |

FOREIGN PATENT DOCUMENTS

| | | |
|---|---|---|
| JP | 3-214359 | 9/1991 |
| JP | 5-120385 | 5/1993 |
| JP | 6-251111 | 9/1994 |
| JP | 7-93389 A | 4/1995 |
| JP | 8-212389 | 8/1996 |
| JP | 11-7548 | 1/1999 |
| JP | 2000-97816 | 4/2000 |

OTHER PUBLICATIONS

Japanese Office Action mailed Jul. 12, 2011 for corresponding Japanese Application No. 2006-349828, with partial English-language translation.

* cited by examiner

*Primary Examiner* — Xiao M. Wu
*Assistant Examiner* — Phi Hoang
(74) *Attorney, Agent, or Firm* — Fujitsu Patent Center (57) ABSTRACT

A meshing device which first divides a geometric model into a plurality of regions that can be easily meshed, and then performs meshing on a region-by-region basis. More specifically, the meshing device is a device for generating an analysis mesh model by meshing a geometric model created by a three-dimensional CAD, and includes: a hole extraction unit for extracting a hole formed in the geometric model; a region dividing unit for dividing the geometric model into a plurality of regions by utilizing the hole; and a region-by-region meshing unit for meshing the geometric model on a region-by-region basis. The meshing device is intended to reduce the number of man hours needed for meshing a large and complex geometric model.

10 Claims, 12 Drawing Sheets

HOLE
HOLE
HOLE

HOLE
HOLE
HOLE

MESHING DEVICE

BACKGROUND OF THE INVENTION

1. Field of the Invention

The present invention relates to a meshing device for generating an analysis mesh model by meshing a geometric model created by three-dimensional CAD (Computer Aided Design).

2. Description of the Related Art

Generating an analysis mesh model from a geometric model and performing a structural analysis by a finite element method is widely practiced. In recent years, data created by three-dimensional CAD has been used directly as a geometric model for the analysis of deformation of a cabinet of a notebook PC (Personal Computer), etc. In the case of such a geometric model, notably a geometric model of a large and complex cabinet cover or the like, if the meshing is performed directly on it, it is often not possible to generate a mesh model for high accuracy analysis because of delamination of surfaces, mismatching of edges, etc.

In such a case, the process returns to a CAD to repeat geometric correction and mesh generation, thus taking considerable time before a mesh model for high accuracy analysis can be generated. Under the circumstances, for a large and complex model it is desired to reduce the number of man hours required to repeat geometric correction and mesh generation.

In Japanese Unexamined Patent Publication No. H05-120385, a prior art document related to the present invention, there is disclosed a modeling system that includes: a geometric model entering means for creating a two-dimensional surface model or a three-dimensional shell model, and for storing the thus created model in a geometric model database; a geometric model dividing means for recognizing the geometric model, and for automatically dividing the geometric model into quadrilateral or triangular parts; and a mesh model generating means for generating a mesh model from the thus divided geometric model, and for storing the mesh model in a mesh model database, while displaying the mesh model on a display device.

On the other hand, Japanese Unexamined Patent Publication No. H03-214359, which relates to a perforated block dividing method as a preparatory step to a meshing step in an input data creation process for structural analysis of a part, discloses a method for efficiently processing holes formed in the part.

Further, Japanese Unexamined Patent Publication No. H11-7548 discloses an element dividing method that uses a finite element method, wherein graphic elements segmented by attribute, each represented by a line drawing, are input as analysis targets, and a block recognizing unit recognizes each analysis target as a set of blocks by classifying the elements according to the segment, and wherein setting and meshing are performed for each block, thereby making it possible to perform the meshing of an analysis model in a simple and quick way.

On the other hand, Japanese Unexamined Patent Publication No. 2000-97816 discloses a method for assisting mesh generation in a three-dimensional ground analysis, wherein the mesh density of an analysis model is set for each of three-dimensional parts forming the analysis model, and the meshing is performed on each three-dimensional part by giving higher priority to a three-dimensional part having a higher mesh density, while for a three-dimensional part adjacent thereto and having a coarser mesh density, the meshing condition for its boundary face or boundary line is set the same as that of the three-dimensional part having the higher mesh density, thereby making it possible to perform the meshing associated with the correction of the three-dimensional part in a simple and quick way.

SUMMARY OF THE INVENTION

The present invention has been devised in view of the above problem, and an object of the invention is to reduce the man-hours needed when meshing a large and complex geometric model, by providing a meshing device that first divides the geometric model into a plurality of regions that can be easily meshed, and then performs meshing on a region-by-region basis.

To achieve the above object, according to the present invention, there is provided a meshing device for generating an analysis mesh model by meshing a geometric model created by three-dimensional CAD, comprising: a hole extraction unit for extracting a hole formed in the geometric model; a region dividing unit for dividing the geometric model into a plurality of regions by utilizing the hole; and a region-by-region meshing unit for meshing the geometric model on a region-by-region basis.

In one preferred mode, the region dividing unit divides the geometric model into the regions by forming dividing lines or dividing faces by extending sides or faces of the hole up to edges of the geometric model.

In one preferred mode, the region dividing unit divides the geometric model into the regions by forming dividing lines or dividing faces by extending lines or faces passing through a center point or a centerline of the hole up to edges of the geometric model.

In one preferred mode, the region dividing unit divides the geometric model into the regions by forming dividing lines or dividing faces starting from three corners located inside the hole relative to an outer periphery of the geometric model and ending at corners of other holes which are located nearest to the three corners, while also forming dividing lines or dividing faces by extending two lines or faces passing through the remaining corner of the hole up to edges nearest to the outer periphery of the geometric model.

In one preferred mode, the region dividing unit divides the geometric model into the regions by deleting or moving any one of the formed dividing lines or dividing faces that crosses a boss, rib, or a rising wall.

According to the present invention, there is also provided a computer-readable recording medium having a meshing program recorded thereon for causing a computer to function as the meshing device, and a meshing method to be implemented in the meshing device.

According to the present invention, there is also provided an analyzing apparatus comprising: a hole extraction unit for extracting a hole formed in a geometric model created by three-dimensional CAD; a region dividing unit for dividing the geometric model into a plurality of regions by utilizing the hole; a region-by-region meshing unit for generating an analysis mesh model by meshing the geometric model on a region-by-region basis; an analyzing unit for receiving the analysis mesh model, and for obtaining an analysis result; and an analysis result evaluation unit for evaluating the analysis result.

The meshing device according to the present invention divides the geometric model into a plurality of regions, and meshes the geometric model on a region-by-region basis; accordingly, if a fault occurs, model correction and meshing need only be repeated for the faulty region, which serves to reduce processing time. Further, the mesh generation becomes easier as the size of the model decreases. Furthermore, since the geometric model is divided into a plurality of regions by utilizing the holes formed therein, the plurality of regions thus generated can be easily meshed.

BRIEF DESCRIPTION OF THE DRAWINGS

Further features and advantages of the present invention will be apparent from the following description with reference to the accompanying drawings, in which.

DESCRIPTION OF THE PREFERRED EMBODIMENTS

Figure 1:
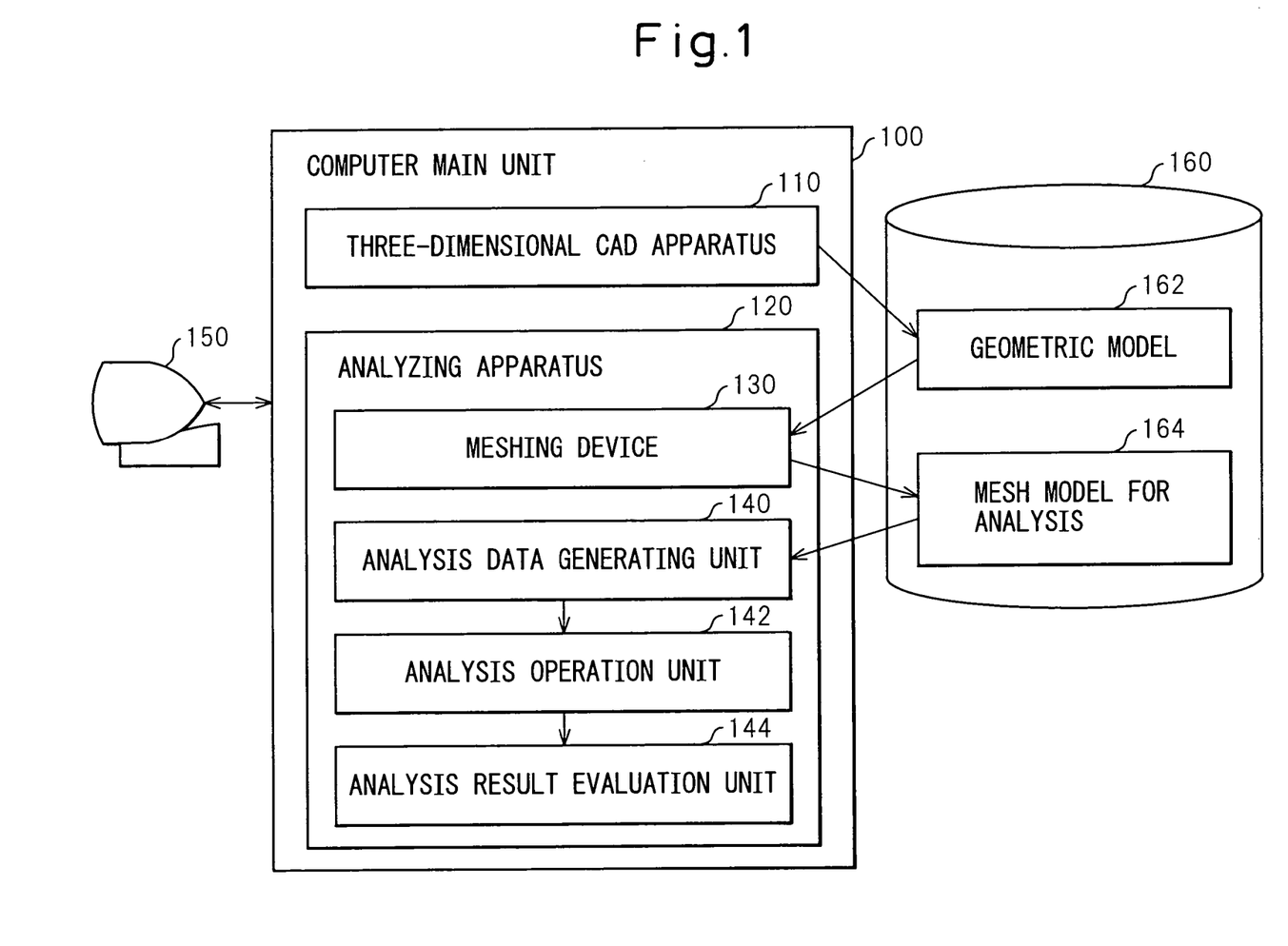
FIG. 1 is a diagram showing the configuration of a system implementing a meshing device according to the present invention.

The embodiments of the present invention will be described below with reference to the accompanying drawings. FIG. 1 is a diagram showing the configuration of a system implementing a meshing device according to the present invention. In the figure, reference numeral 100 is a computer main unit comprising a processor, main memory, etc., 150 is an input/output device comprising a keyboard, mouse, display, etc. to interface with the user, and 160 is an auxiliary memory constructed from a magnetic disk, etc.

The computer main unit 100 functions as a three-dimensional CAD apparatus 110 or an analyzing apparatus 120 by loading a corresponding program into the main memory and causing the processor to execute the program. The analyzing apparatus 120 comprises, in addition to the meshing device 130 according to the present invention, an analysis data generating unit 140, an analysis operation unit 142, and an analysis result evaluation unit 144. The auxiliary memory 160 is used to store a geometric model 162, an analysis mesh model 164, etc.

The meshing device 130 according to the present invention divides the geometric model into a plurality of regions by utilizing holes, and performs meshing on a region-by-region basis. For example, in a large and complex integral cabinet cover, such as that of a notebook PC or the like, a plurality of large holes are formed for accommodating an HDD, DVD, FDD, battery, keyboard, etc. A vertical rising boss for mounting a lid cover, a vertically rising rib or wall for providing rigidity, etc. are formed around each hole.

Figure 2A:
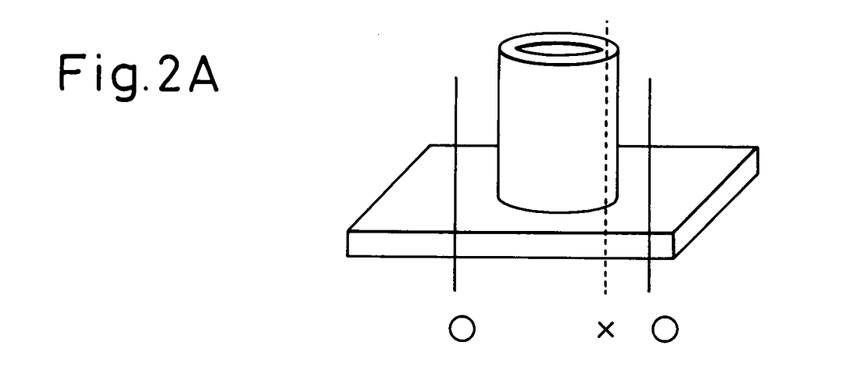
FIGS. 2A, 2B, and 2C are diagrams explaining a method of division at portions near a boss, a rib, and a rising wall, respectively.
Figure 2B:
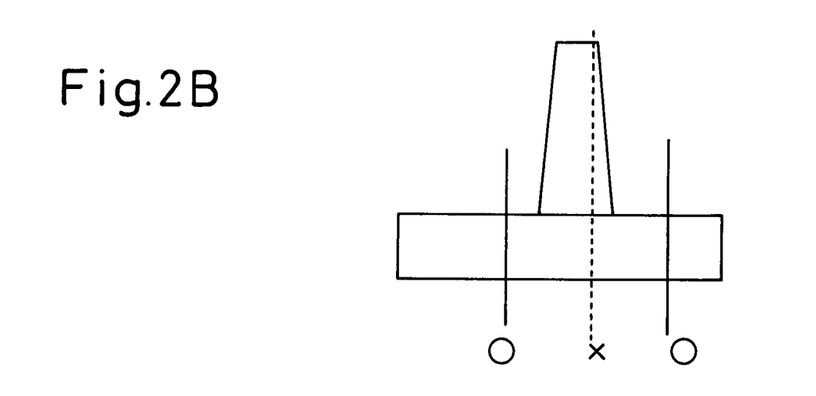
Figure 2C:
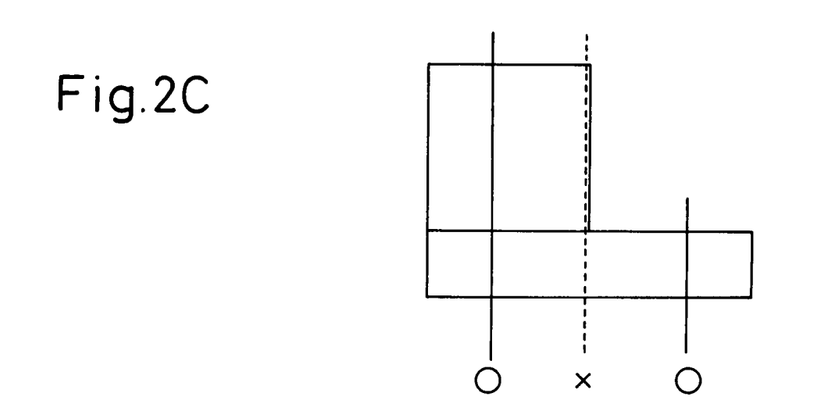

It is desirable that, as shown in FIGS. 2A, 2B, and 2C, dividing lines or dividing faces in which to divide the large model into a plurality of regions, i.e., into smaller models, be set by avoiding the lid cover mounting boss (FIG. 2A), the rising portion of the rib (FIG. 2B), the rising wall (FIG. 2C), etc. in order to make the mesh shape as close as possible to that of an equilateral triangle or a regular tetrahedron. That is, dividing the model by crossing such portions as the boss, the rising portion of the rib, the rising wall, etc. is not desirable, because it would result in the generation of a mesh of a pointed shape.

In view of this, it is preferable to set the dividing lines or dividing faces by utilizing the portions where the holes are opened. This is because the boss, the rising portion of the rib, the rising wall, etc., are often formed in a clustered manner around the portion of each hole, while such projections are formed in a random manner in portions where no holes are formed.

When forming the dividing lines or dividing faces by utilizing the holes, two methods are possible: one is to form a dividing line or dividing face along each of the four sides or faces of each hole, and the other is to form two dividing lines or dividing face in such a manner as to form a cross passing through the center of each hole. In the former method, the number of divisions increases compared with the latter method, but the regions (smaller models) created by the division are each approximated to a rectangle. In the latter method, the number of divisions decreases compared with the former method, but the regions (smaller models) created by the division are each approximated to an L-shape or T-shape.

Considering the ease of processing for model correction when the model cannot be meshed successfully, it is preferable to employ the former method that can create the regions (smaller models) approximated to rectangles. In either method, adjustments have to be made, for example, by moving the dividing lines or dividing faces so that the dividing lines or dividing faces do not cross the projections such as the boss, the rising portion of the rib, the rising wall, etc. that are located in portions where no holes are formed. The method of meshing according to the present invention, including the processing before and after the meshing, will be described in detail below with reference to the drawings.

Figure 3:
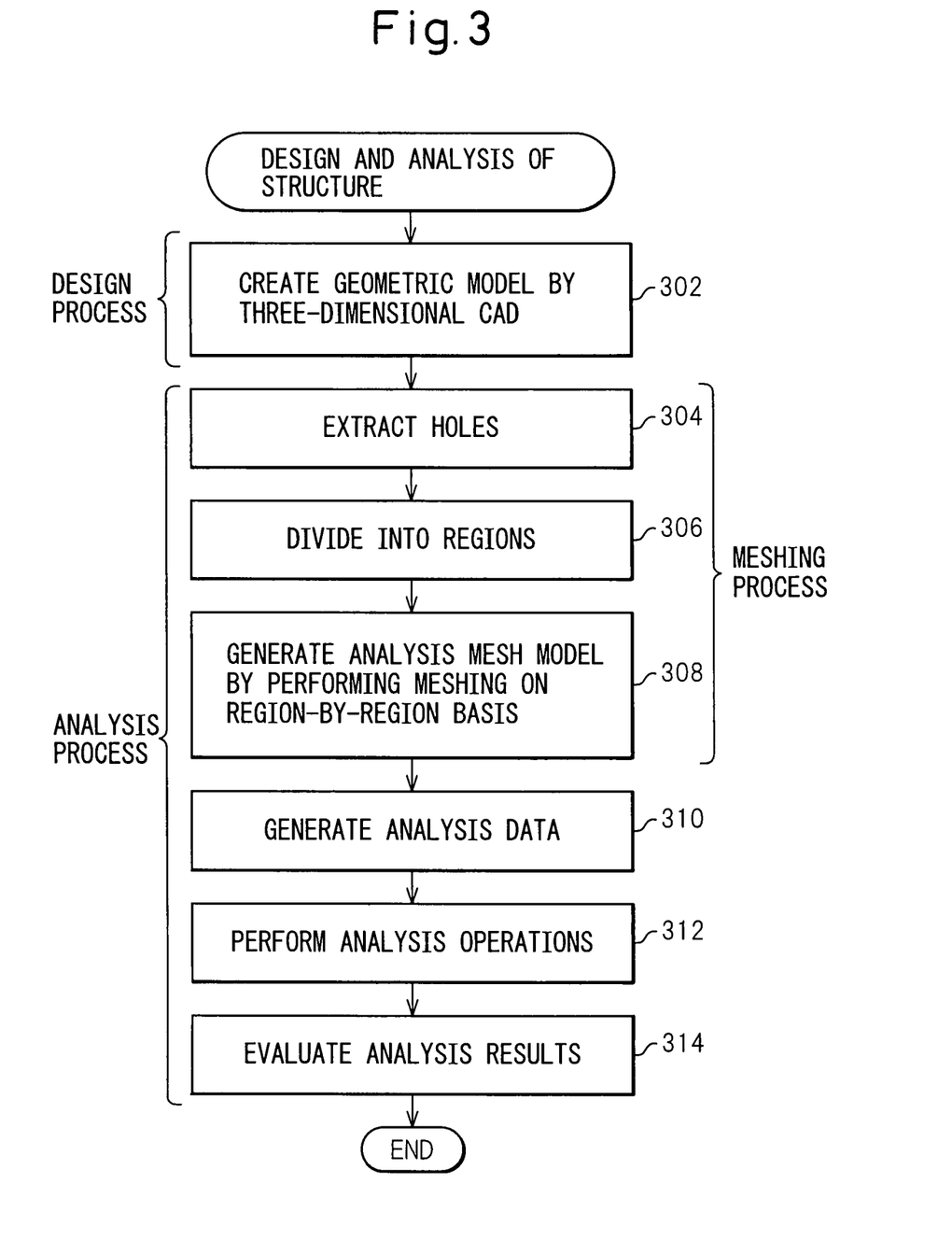
FIG. 3 is a flowchart showing a general procedure for the design of a structure and analysis thereof.

FIG. 3 is a flowchart showing a general procedure for the design of a structure and analysis thereof. First, the three-dimensional CAD apparatus 110 creates the geometric model 162 (step 302). Next, the meshing device 130 in the analyzing apparatus 120 extracts holes from the geometric model 162 (step 304). Then, the meshing device 130 divides the geometric model into a plurality of regions (smaller models) by using the extracted holes (step 306). Further, the meshing device 130 performs meshing on a region-by-region basis to create analysis mesh models 164 (step 308).

Next, the analysis data generating unit 140 in the analyzing apparatus 120 merges the analysis mesh models created for the respective regions, and generates analysis data by adding analysis conditions such as load conditions (step 310). Then, the analysis operation unit 142 in the analyzing apparatus 120 receives the thus generated analysis data, and performs analysis operations using a finite element method (step 312). Finally, the analysis result evaluation unit 144 in the analyzing apparatus 120 evaluates the analysis results obtained by the analysis operations (step 314).

In the above sequence of steps, the step 302 constitutes the design process, and the steps 304, 306, and 308 constitute the meshing process, while the steps 304, 306, 308, 310, 312, and 314 constitute the analysis process. The meshing process will be described in detail below.

Figure 4:
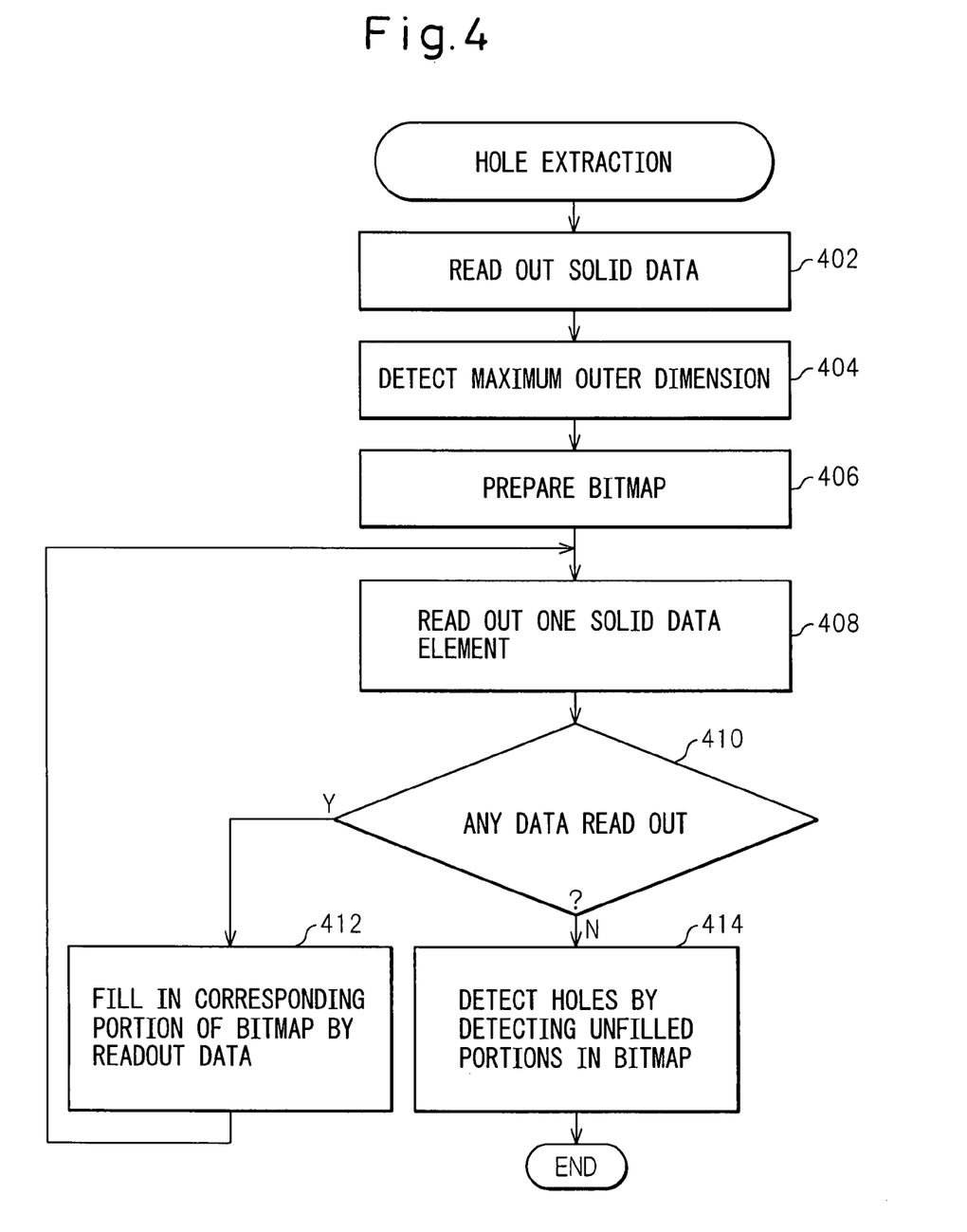
FIG. 4 is a flowchart showing a procedure for hole extraction.

FIG. 4 is a flowchart showing a procedure for the hole extraction (step 304 in FIG. 3). First, solid data (three-dimensional data described by a set of faces) as the geometric model is read out (step 402). Next, a maximum outer dimension is detected based on the readout data (step 404). Then, based on the detected maximum outer dimension, a three-dimensional bitmap having prescribed outer dimensions and prescribed resolution is prepared (step 406).

Next, one solid data element is read out (step 408). Then, it is determined whether any data has been read out (step 410); if any data has been read out, the corresponding portion of the bitmap is filled in based on the readout data (step 412). On the other hand, if no data has been read out, this means that the data read process is completed; accordingly, holes are detected by detecting unfilled portions in the bitmap (step 414).

Figure 5:
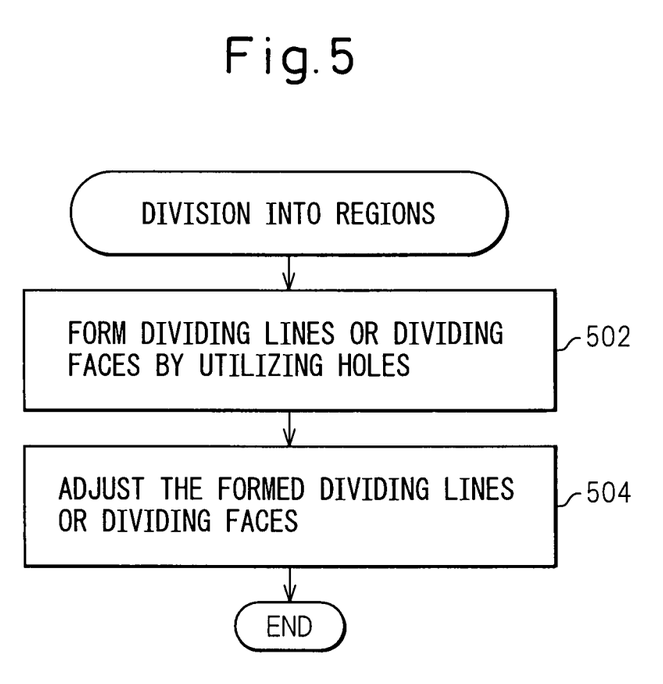
FIG. 5 is a flowchart showing a procedure for region division.
Figure 6A:
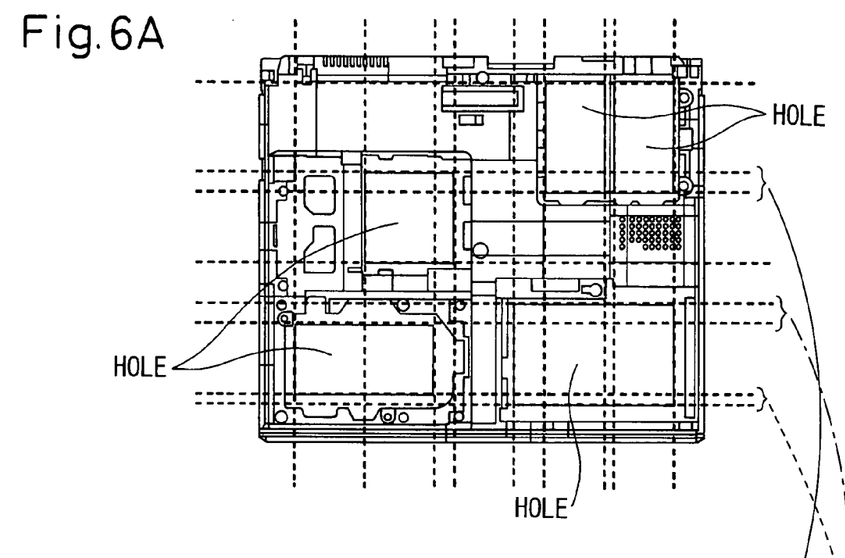
FIG. 6A is a diagram explaining the region division utilizing the sides or faces of holes.
Figure 6B:
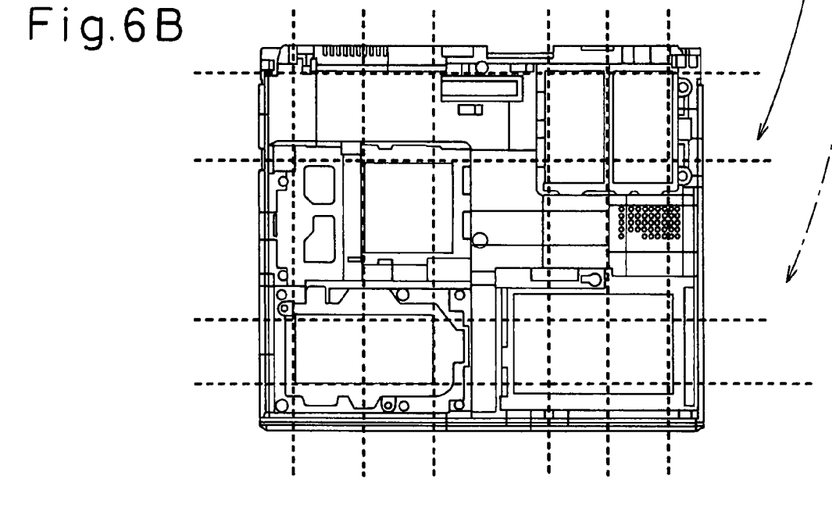
FIG. 6B is a diagram explaining how some of the dividing lines or faces formed in FIG. 6A are deleted.
Figure 7A:
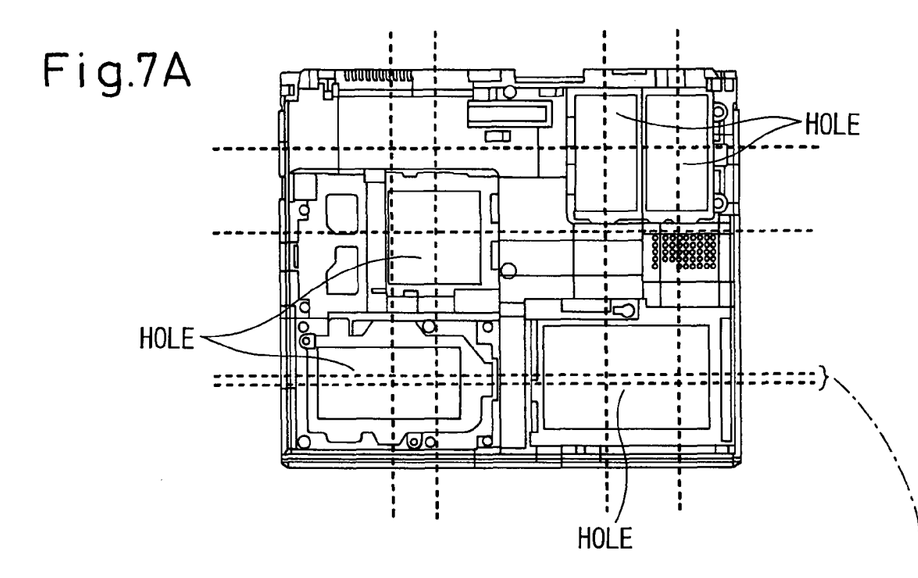
FIG. 7A is a diagram explaining the region division utilizing the center points or centerlines of the respective holes.
Figure 7B:
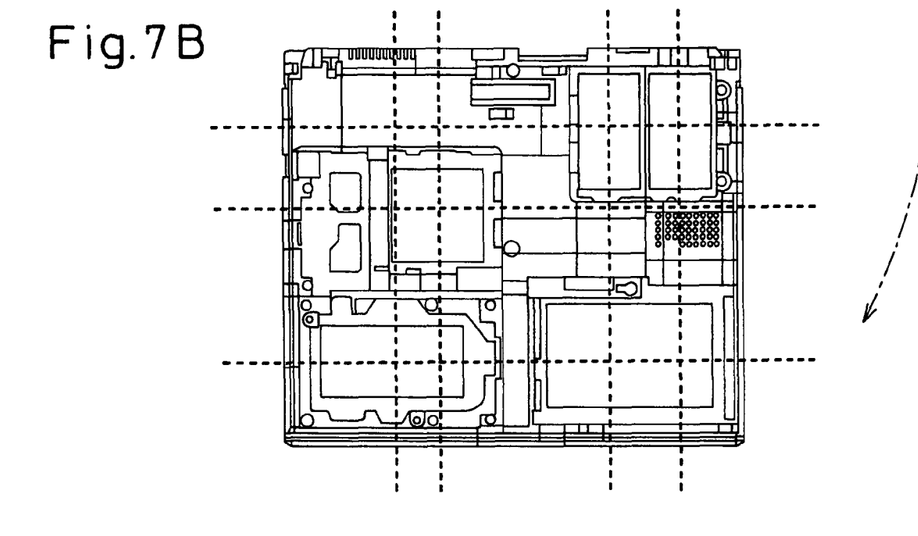
FIG. 7B is a diagram explaining how some of the dividing lines or faces formed in FIG. 7A are deleted.

FIG. 5 is a flowchart showing a procedure for the region division (step 306 in FIG. 3). First, dividing lines or dividing faces are formed by utilizing the extracted holes (step 502). For example, by extending the sides or faces of the holes up to the edges of the geometric model, as shown in FIG. 6A, dividing lines (in the case of two-dimensional division) or dividing faces (in the case of three-dimensional division) are formed in a grid-like pattern. Alternatively, by extending the lines or faces passing through the center points or centerlines of the respective holes up to the edges of the geometric model, as shown in FIG. 7A, dividing lines or dividing faces are formed in a grid-like pattern.

Figure 8:
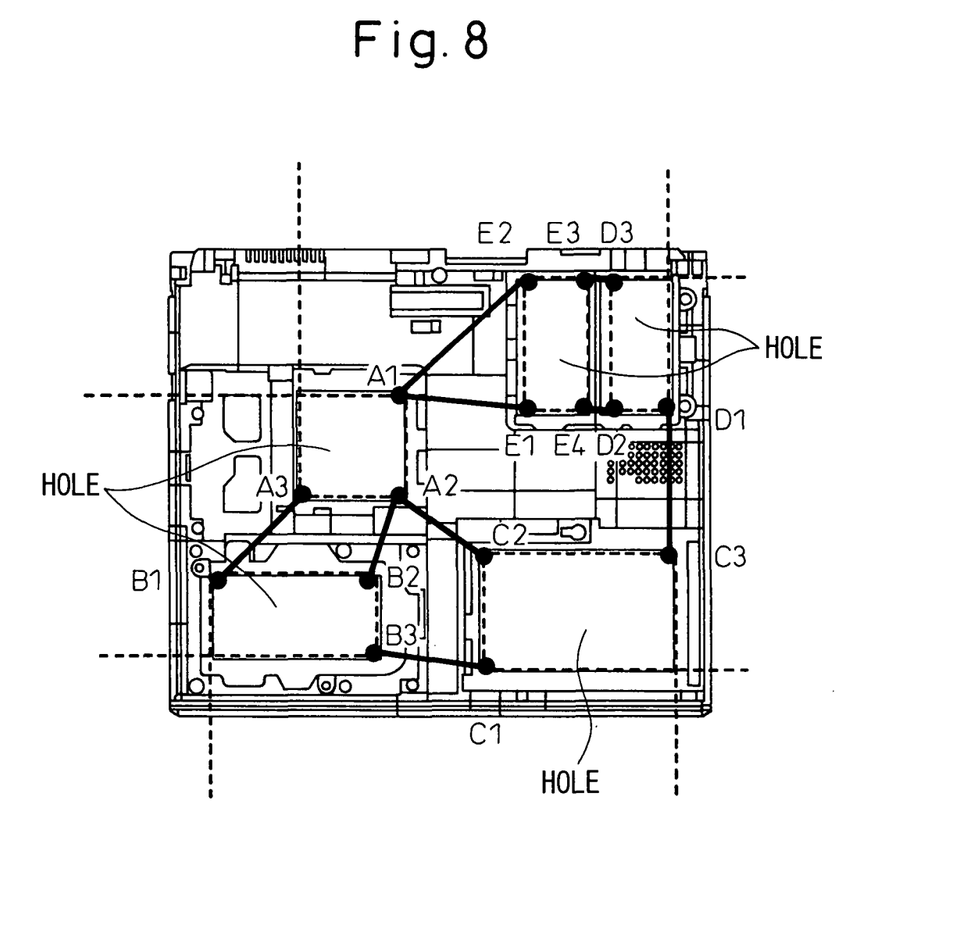
FIG. 8 is a diagram explaining the region division performed by forming dividing lines or dividing faces so as to join the corners of the holes.

In another alternative method, the dividing lines or dividing faces are formed as shown in FIG. 8: that is, lines or faces are drawn starting from three corners located inside each hole relative to the outer periphery of the geometric model and ending at those corners of other holes which are located nearest to the three respective corners, and then, two lines or faces passing through the remaining corner of each hole are extended to the edges nearest to the outer periphery of the geometric model.

A detailed procedure for forming the dividing faces so as to join the corners of the respective holes as described above is shown in the flowchart of FIG. 9. First, dividing face data is generated by extending the faces of the holes to the edges of the geometric model (step 902). Next, the dividing faces, except for the outermost ones of the grid-like pattern and the ones coinciding with the faces of the holes, are deleted (step 904).

Figure 9:
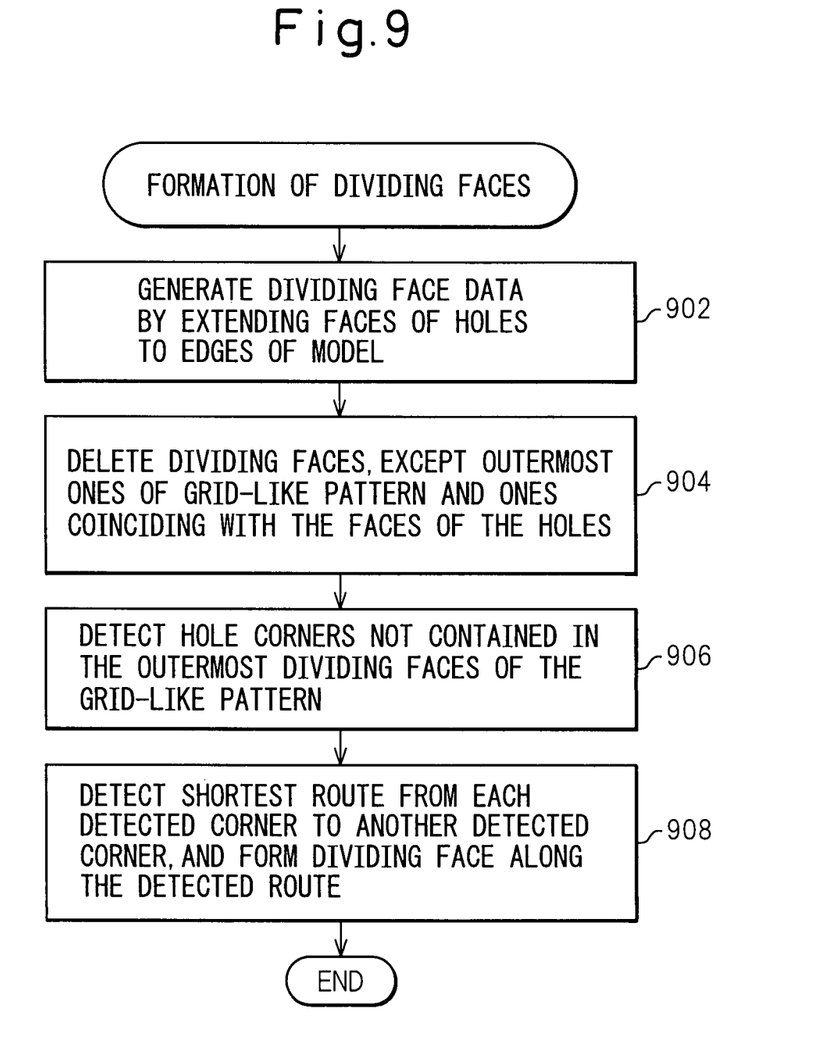
FIG. 9 is a flowchart showing a detailed procedure for forming the dividing faces so as to join the corners of the respective holes.

Next, the corners of the holes which are not contained in the outermost dividing faces of the grid-like pattern are detected (step 906). In the example of FIG. 8, corners A1, A2, A3, B1, B2, B3, C1, C2, C3, D1, D2, D3, E1, E2, E3, and E4 are detected. Finally, the shortest route from each detected corner to another detected corner is detected, and a dividing face along the detected route is formed (step 908). In the example of FIG. 8, dividing faces are formed along routes A1-E1, A2-B2, A3-B1, B3-C1, C2-A2, C3-D1, D2-E4, D3-E3, and E2-A1, respectively.

Turning back to FIG. 5, after completing step 502, the dividing lines or dividing faces thus formed are finally adjusted. That is, if there is any dividing line or dividing face that crosses a boss, a rib, or a rising wall, such a dividing line or dividing face is deleted or moved (step 504).

Figure 10:
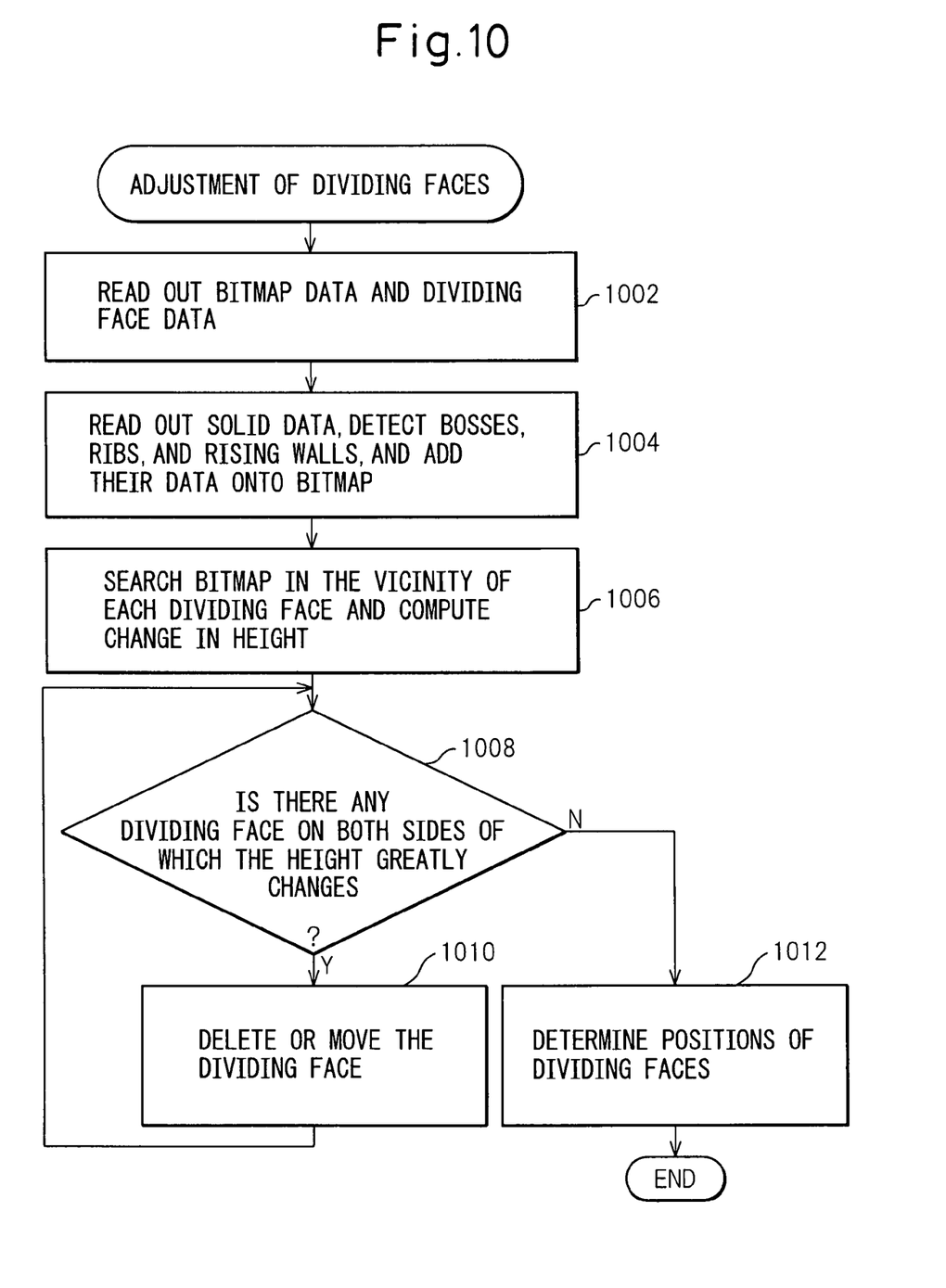
FIG. 10 is a flowchart showing a procedure for adjusting the dividing faces.

FIG. 10 is a flowchart showing a procedure for adjusting the dividing faces (step 504 in FIG. 5). First, the bitmap data and the dividing face data are read out (step 1002). Next, the solid data is read out, bosses, ribs, and rising walls are detected, and data relating to them are added onto the bitmap (step 1004). Then, the bitmap data in the vicinity of each dividing face shown in the dividing face data is searched to compute any change in height due to the presence of a boss, a rib, or a rising wall (step 1006). Next, it is determined if there is a dividing face on both sides of which the height greatly changes (step 1008).

Figure 11:
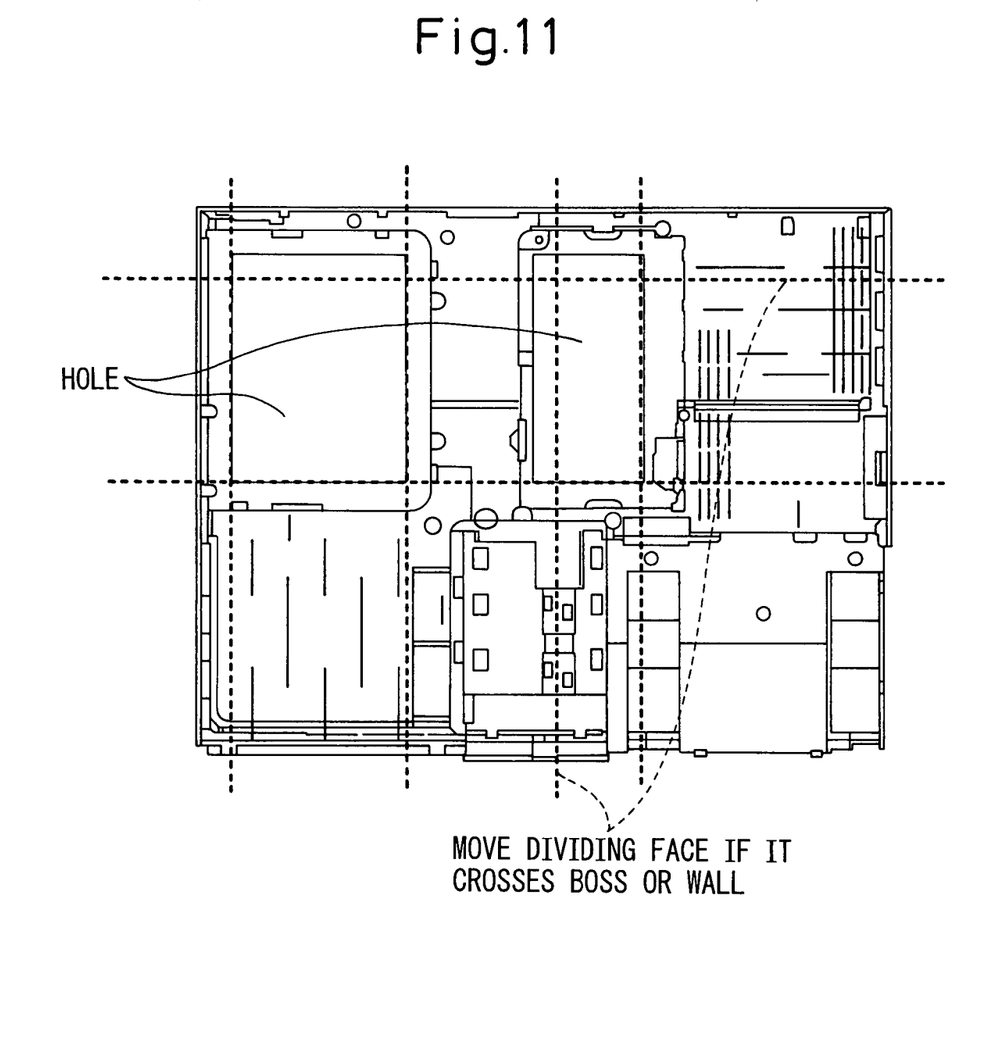
FIG. 11 is a diagram explaining how dividing lines or dividing faces are moved.

If there is a dividing face, the dividing face is deleted or moved (step 1010). For example, if there is another dividing face near that dividing face, the dividing face is deleted, as shown in FIGS. 6A and 6B and FIGS. 7A and 7B. Alternatively, the dividing face is moved, as shown in FIG. 11. After carrying out the step 1010, the process returns to step 1008. When it is determined in step 1008 that there is no dividing face that crosses a boss, a rib, or a rising wall, the positions of the respective dividing faces are finally determined (step 1012).

Figure 12:
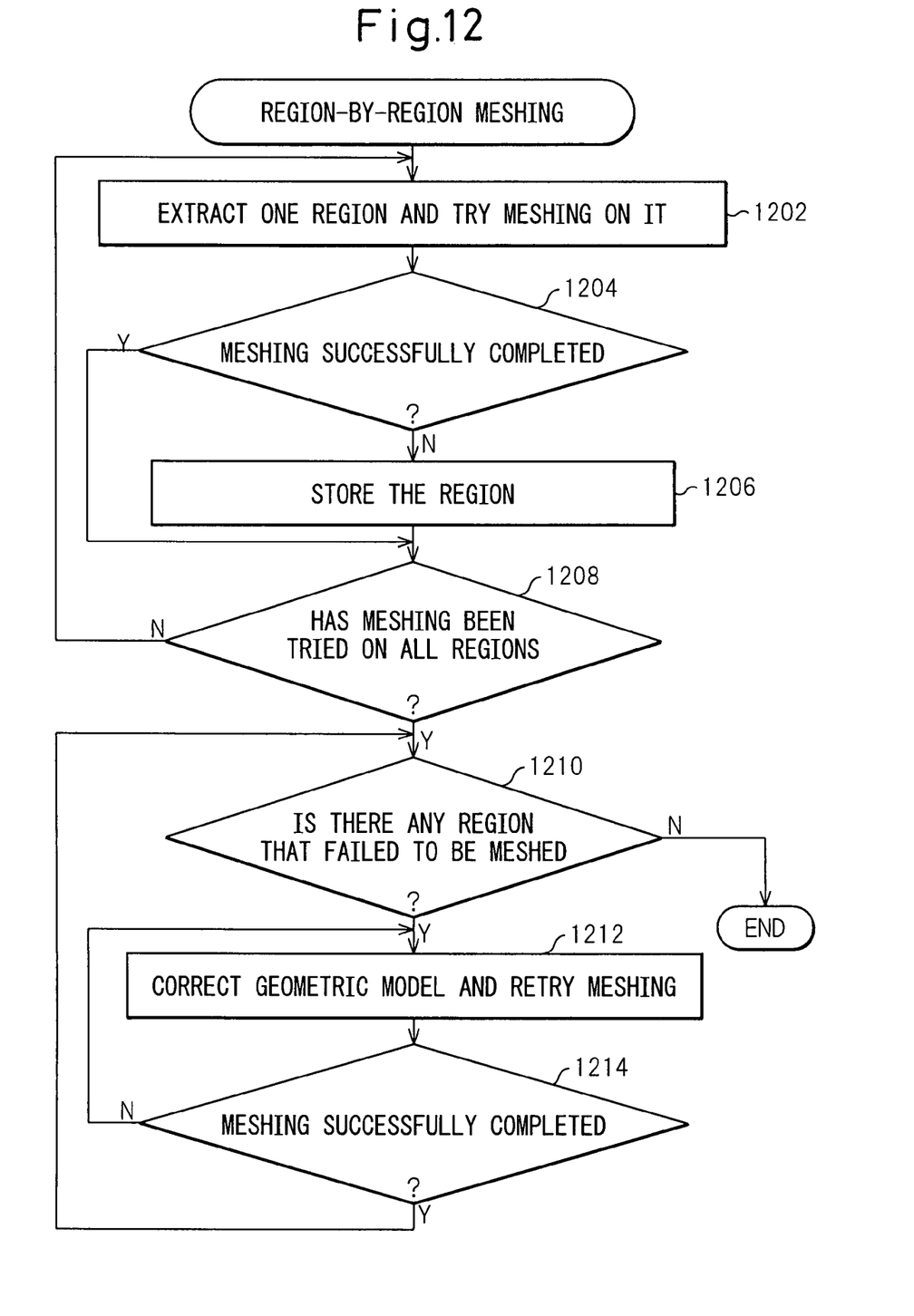
FIG. 12 is a flowchart showing a procedure for region-by-region meshing.

FIG. 12 is a flowchart showing a procedure for the region-by-region meshing (step 308 in FIG. 3). First, one region is extracted, and meshing is performed (step 1202). Next, it is determined whether the meshing has been successfully completed (step 1204). If unsuccessful, the region is stored in memory (step 1206). Next, it is determined whether meshing has been performed on all the regions (step 1208). If the answer is NO, the process returns to step 1202.

When it is determined that meshing has been performed on all the regions, then it is determined whether there is any region that has failed to be meshed (step 1210). If there is a region that has failed to be meshed, the user corrects the corresponding portion of the geometric model, and meshing is retried (step 1212). Next, it is determined whether the retry of the meshing has been successfully completed (step 1214). If unsuccessful, the process returns to step 1212; on the other hand, if the retry has been successfully completed, the process returns to step 1210. When it is determined in step 1210 that there is no longer any region that has failed to be meshed, the process is terminated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A meshing device for generating an analysis mesh model by meshing a geometric model created by three-dimensional CAD, comprising:
   a hole extraction unit to extract a two-dimensional hole formed in said geometric model;
   a region dividing unit to divide said geometric model into a plurality of regions by forming dividing lines or dividing faces by extending the lines or faces passing through a center point or a center line of said two-dimensional hole up to edges of said geometric model, without filling the extracted two-dimensional hole with meshes; and
   a region-by-region meshing unit to mesh said geometric model on a region-by-region basis, each of which regions is defined by said dividing lines or dividing faces.

2. The meshing device according to claim 1, wherein said region dividing unit divides said geometric model into regions by deleting or moving any one of said formed dividing lines or dividing faces that crosses a boss, a rib, or a rising wall.

3. A non-transitory computer-readable recording medium having a meshing program recorded thereon for causing a computer to implement a function for generating an analysis mesh model by meshing a geometric model created by three-dimensional CAD, wherein said meshing program causes said computer to implement the function comprising:
 extracting a two-dimensional hole formed in said geometric model;
 dividing said geometric model into a plurality of regions by forming dividing lines or dividing faces by extending the lines or faces passing through a center point or a center line of said two-dimensional hole up to edges of said geometric model, without filling the extracted two-dimensional hole with meshes; and
 meshing said geometric model on a region-by-region basis, each of which regions is defined by said dividing said dividing lines or dividing faces.

4. The recording medium according to claim 3, wherein said dividing divides said geometric model into said regions by deleting or moving any one of said formed dividing lines or dividing faces that crosses a boss, a rib, or a rising wall.

5. A meshing method for generating an analysis mesh model by meshing a geometric model created by three-dimensional CAD,
 extracting a two-dimensional hole formed in said geometric model;
 dividing said geometric model into a plurality of regions by forming dividing lines or dividing faces by extending the lines or faces gassing through a center point or center line of said two-dimensional hole up to edges of said geometric model, without filling the extracted two-dimensional hole with meshes; and
 meshing said geometric model on a region-by-region basis, each of which regions is defined by said dividing lines or dividing faces.

6. The meshing according to claim 5, wherein said geometric model is divided into said plurality of regions by deleting or moving any one of said formed dividing lines or dividing faces that crosses a boss, a lib, or a rising wall.

7. An analyzing apparatus comprising:
 a hole extraction unit to extract a two-dimensional hole formed in a geometric model created by three-dimensional CAD;
 a region dividing unit to divide said geometric model into a plurality of regions by forming dividing lines or dividing faces by extending the lines or faces passing through a center point or a center line of said two-dimensional hole up to edges of said geometric model, without filling the extracted two-dimensional hole with meshes;
 a region-by-region meshing unit to generate an analysis mesh model by meshing said geometric model on a region-by-region basis, each of which regions is defined by said dividing lines or dividing faces;
 an analyzing unit to receive said analysis mesh model, and to obtain an analysis result; and
 an analysis result evaluation unit to evaluate said analysis result.

8. A meshing device for generating an analysis mesh model by meshing a geometric model created by three-dimensional CAD, comprising:
 a hole extraction unit to extract a hole formed in said geometric model;
 a region dividing unit to divide said geometric model into a plurality of regions by forming dividing lines or dividing faces along said hole; and
 a region-by-region meshing unit to mesh said geometric model on a region-by-region basis, wherein
 said region dividing unit divides said geometric model into said region by forming dividing lines or dividing faces starting from three corners located inside said hole relative to an outer periphery of said geometric model and ending at corners of other holes which are located nearest to said three corners, while also forming said dividing lines or dividing faces by extending two lines or faces passing through the remaining corner of said hole up to edges nearest to the outer periphery of said geometric model.

9. A non-transitory computer-readable recording medium having a meshing program recorded thereon for causing a computer to implement a function for generating an analysis mesh model by meshing a geometric model created by three-dimensional CAD, wherein said meshing program causes said computer to implement the function comprising:
 extracting a hole formed in said geometric model;
 dividing said geometric model into a plurality of regions by forming dividing lines or dividing faces along said hole; and
 meshing said geometric model on a region-by-region basis, wherein
 said dividing divides said geometric model into said region by forming said dividing lines or dividing faces starting from three corners located inside said hole relative to an outer periphery of said geometric model and ending at corners of other holes which are located nearest to said three corners, while also forming said dividing lines or dividing faces by extending two lines or faces passing through the remaining corner of said hole up to edges nearest to the outer periphery of said geometric model.

10. A meshing method for generating an analysis mesh model by meshing a geometric model created by three-dimensional CAD, comprising:
 extracting a hole formed in said geometric model;
 dividing said geometric model into a plurality of regions by forming dividing lines or dividing faces along said hole; and
 meshing said geometric model on a region-by-region basis, wherein
 geometric model is divided into said plurality of regions by forming said dividing lines or dividing faces starting from three corners located inside said hole relative to an outer periphery of said geometric model and ending at corners of other holes which are located nearest to said three corners, while also forming said dividing lines or dividing faces by extending two lines or faces passing through the remaining corner of said hole up to edges nearest to the outer periphery of said geometric model.

* * * * *